United States Patent [19]
Lenhardt

[11] Patent Number: 5,462,199
[45] Date of Patent: Oct. 31, 1995

[54] APPARATUS FOR DISCHARGING PASTY COMPRESSIBLE SUBSTANCES OF HIGH VISCOSITY

[75] Inventor: Karl Lenhardt, Neuhausen-Hamberg, Germany

[73] Assignee: Lenhardt Maschinenbau GmbH, Neuhausen-Hamberg, Germany

[21] Appl. No.: 177,199

[22] Filed: Dec. 30, 1993

Related U.S. Application Data

[63] Continuation of Ser. No. 634,168, filed PCT/EP89/00423, Apr. 20, 1989, abandoned.

[30] Foreign Application Priority Data

Apr. 20, 1988 [DE] Germany .......................... 38 13 161.7
May 7, 1988 [DE] Germany .......................... 38 15 618.0

[51] Int. Cl.⁶ ................................ B05C 5/02; B67D 5/14
[52] U.S. Cl. ........................ 222/54; 222/146.5; 222/504; 118/667
[58] Field of Search ................................ 222/504, 54, 56, 222/63, 64, 334, 146.2, 146.5, 55; 239/587.1; 118/667, 692, 693

[56] References Cited

U.S. PATENT DOCUMENTS

| | | | |
|---|---|---|---|
| 2,376,838 | 5/1945 | Walter | 222/334 |
| 3,128,912 | 4/1964 | Cash | 222/64 X |
| 3,130,876 | 4/1964 | Baker | 222/334 X |
| 3,430,814 | 3/1969 | Cymbalisty | 222/64 |
| 3,797,808 | 3/1974 | Ma et al. | 222/63 X |
| 3,843,023 | 10/1974 | Vroom | 222/504 X |
| 3,930,600 | 1/1976 | Gardner | 222/334 |
| 4,378,897 | 4/1983 | Kattelmann | 222/56 |
| 4,389,001 | 6/1983 | Franklin | 222/63 |
| 4,498,318 | 2/1985 | Mitter | 222/56 X |
| 4,545,504 | 10/1985 | Fabel et al. | 222/63 X |
| 4,564,410 | 1/1986 | Clitheros et al. | 156/578 X |
| 4,667,852 | 5/1987 | Siemann | 222/54 |
| 4,690,310 | 9/1987 | Rasmussen | 222/334 X |
| 4,711,379 | 12/1987 | Price | 222/146.5 X |
| 4,714,425 | 12/1987 | Lenhardt | 222/146.5 X |
| 4,822,647 | 4/1989 | Nozaki et al. | 239/126 X |
| 4,830,737 | 5/1989 | Cole, Jr. | 222/56 X |
| 4,890,573 | 1/1990 | Zaber | 118/667 |
| 5,087,352 | 2/1992 | Cole, Jr. | 222/56 X |
| 5,123,569 | 6/1992 | Lindner | 222/56 |

FOREIGN PATENT DOCUMENTS

2539477 3/1976 Germany .......................... 222/504

Primary Examiner—Andres Kashnikow
Assistant Examiner—Lisa Douglas
Attorney, Agent, or Firm—Dvorak and Traub

[57] ABSTRACT

The apparatus comprises a buffer container (1) for receiving the pasty substance of high viscosity, a feed line (11), through which the buffer container (1) can be refilled with the substance, a pressure generator (2 to 5), by which the substance in the buffer container (1) can be pressurizes, a nozzle (10), which is close to the buffer container (1), a pressure sensor (43) downstream of the pressure generator, and a controller (44). As a result, the metering rate can exactly be controlled close to the nozzle (10).

17 Claims, 8 Drawing Sheets

APPARATUS FOR DISCHARGING PASTY COMPRESSIBLE SUBSTANCES OF HIGH VISCOSITY

CROSS-REFERENCES TO RELATED APPLICATIONS

This application is a continuation of application Ser. No. 07/634,168, filed as PCT/EP89/00423, Apr. 20, 1989.

This invention relates to an apparatus for discharging pasty compressible substances of high viscosity, particularly for applying sealants and adhesives to body parts in the manufacture of automobiles, comprising a supply container for holding the substance, a nozzle for discharging the substance, a feed line leading from the supply container to the nozzle and a pump for discharging the substance into the feed line.

BACKGROUND OF THE INVENTION

This invention is concerned with the metered discharge and application of substances which include, e.g., hot-processable one-component sealants and adhesives based on butyl rubber, such as polyisobutylenes, which when heated to a temperature between 80° and 140° C. (in dependence on the type of material) soften to such a degree that they can be pumped, and hot-processable two-component sealants and adhesives, such as thiocols (polysulfides), and cold-processable sealants and adhesives, including cross-linkable ones such as substances based on polyvinyl-chloride, on polyurethane and acryl plastisols.

In the manufacture of automobile bodies it is desired to use such sealants and adhesives in order to seal and/or adhesively join car body parts, for instance, to adhesively bond or seal flanged seams, to seal roof frames, to underline roof arches or to adhesively bond decorative moldings. It is essential that the sealants and adhesives are applied exactly in predetermined quantities at discrete points or in the form of dots beads or endless strips. A highly accurate metering is required because an insufficient application may result in a sealing or adhesive bonding which is inadequate whereas an excessive application may necessitate a removal of surplus sealant or adhesive because such substance has excessively emerged from a flanged seam which has been adhesively bonded or sealed. It is also required that the apparatus for applying such substances can be manipulated and guided by a robot so that the application can be automated.

It is known that such substances can be pumped by means of a barrel pump from a barrel, in which the substances are delivered, and can be fed through a buffer, which is under a constant initial pressure, to an applicator nozzle which can be closed and can be guided by a robot. Such barrel pump has been described, e.g., in EP0171309A1. In that case a relatively long feed line, such as heated piping having articulated joints or a pressure hose, is disposed between the buffer and the nozzle. A disadvantage arises which resides in that a high pressure drop is involved in the feeding of pasty substances of high viscosity through relatively long feed lines. Feeding pressures between 200 bars and 400 bars are not unusual in such cases. On the way from the buffer to the applicator nozzle the feeding pressure decreases virtually to zero when the nozzle is open. When the nozzle is closed, an equalization of pressure will take place in the feed line so that the pressure rises in front of the closed nozzle. As a result, an uncontrolled amount of the substance of high viscosity emerges as the nozzle is opened until the pressure which has built up at the nozzle when it is closed has dropped. Whereas the pressure existing in the feed line when the nozzle is closed can be decreased, e.g., in that a by-pass line is opened, this will involve the not less serious disadvantage that owing to the high viscosity of the substance the latter will initially not be discharged at the desired feed rate when the nozzle is re-opened but will emerge at a lower rate, which will gradually increase. The insufficiently accurate metering will be aggravated by the influence of the compressibility of the highly viscous substances because any change of the pressure conditions in the feed line will change the mass flow rate in the feed line. That undesired effect increases with the length of the feed line because this will also increase the volume which is subjected to fluctuating pressure. The pressure conditions will change particularly strongly when the pump has just been turned off and when it has just been turned on and the metering will be particularly inaccurate when the pump has just been turned on.

It is known that a dependence on a relatively long feed line can be avoided in that such substances of high viscosity are applied by means of an extrusion cylinder, in which a certain amount of the substance is stored. From that extrusion cylinder the substance is extruded by a hydraulically operated piston. When the cylinder is empty, the application process must be interrupted so that the cylinder can be refilled or can be replaced by a refilled cylinder. Such downtimes are frequently undesired. In order to minimize them, extrusion cylinders having the highest possible capacity are employed nut the larger the amount of the substance which is stored in the extrusion cylinder, the stronger will be the undesired influence of the compressibility on the accuracy of the metering. This is so because an increase of the amount of the highly viscous substance will increase the pressure which is required to extrude the substance out of the cylinder and an increasing pressure will increasingly compress the substance. A further disadvantage resides in that the pressure that is required for a uniform extruding will decrease as the cylinder is progressively emptied and that the extent of the required adaptation of pressure will increase with the capacity of the cylinder. A further disadvantage resides in that extrusion cylinders which have a high capacity so that they need not be refilled or replaced with an interruption of the metering operation in short intervals of time will be so heavy that they can no longer be manipulated by a robot under the conditions existing in the manufacture of automobile bodies.

Apparatuses for feeding sealants and adhesives used to seal insulating glass have already been disclosed in DE-A-35 42 767. Said apparatus comprise a buffer consisting of a continuously refillable cylinder, from which the sealant or adhesive can be extruded by a piston without an interruption by a refilling operation and a constant force is exerted on said piston. As a result, the accuracy of the metering will be influenced primarily by the volume or the buffer, by the force exerted on its piston, and by the conditions in the line from the buffer to the nozzle. In the known apparatus a mixer, inter alia, is included in the line from the buffer to the nozzle. But still the compressibility or the substance to be red exerts on the metering accuracy an influence which cannot be neglected and for this reason a metering pump is also included in the line to the nozzle. A further disadvantage resides in that changes of the metering rate during a continuous metering cannot be effected sufficiently quickly and sufficiently accurately.

It is an object of the invention to provide an apparatus which is of the kind described first hereinbefore and which complies with the above-described requirements to be met in the manufacture of automobile bodies and permits pasty compressible substances having a high viscosity to be metered at high accuracy and readily permits the applicator nozzle to be manipulated, and guided by a robot.

That object is accomplished by an apparatus having the features recited in claim 1. Desirable developments of the invention are subject matters of the dependent claims.

The inventor has recognized that for an accurate and fast-reacting metering it is not sufficient to apply pressure to the substance at a relatively large distance from the nozzle by a piston by which a predetermined constant force is exerted. In accordance with the invention a buffer container is provided in addition to the pump and is disposed near the mouth of the nozzle and has a capacity which can be varied by a pressure generator, which is disposed directly at or in the buffer container. By means of that buffer container, fluctuations or the reed rate on the way from the supply container to the buffer container can be compensated. Besides, the buffer container can hold a certain quantity of the substance in dependence on the capacity of the buffer container so that the metering operation can proceed without an interruption even when the handling rate or the pump decreases or is interrupted. To permit a refilling of the buffer container after a standstill or a reduced discharge rate of the pump, it is sufficient that the pressure under which the pump discharges the substance into the buffer container exceeds the pressure which is exerted by the pressure generator on the substance contained in the buffer container. That pump may consist or a barrel pump, such as is described in French Patent Application 84/14,182. Because the pressure generator applies a pressure to the substance in the buffer container even during the refilling operation, it is ensured that the substance can be extruded through the nozzle with a uniform metering accuracy even during the refilling operation because that accuracy will depend on the pressure applied by the pressure generator unless the buffer container has been refilled to its maximum capacity so that the pressure in the buffer container has undesirably risen. In order to avoid that it is desirable to provide switching means, such as one or two position sensors, which will respond before the buffer container is completely full and which will then turn off the pump, and which will also respond before the buffer container is entirely empty and will then turn on the pump. A capacity of an order not in excess of 100 ml will be sufficient so that the volume by which the capacity of the buffer container may be changed by the buffer action may be very small; 100 ml are sufficient for the stated purpose. The capacity is preferably changed by not more than 70 ml by the buffer action.

With such small volumes the compressibility of the highly viscous substance has hardly an influence on the metering accuracy and its influence on the metering accuracy will decrease as the volumes are increased. At the same time, the unit consisting of the nozzle, the buffer container and the pressure generator becomes so light in weight that it can easily be manipulated and guided by a robot and an uninterrupted metering is nevertheless possible.

But the result produced by the invention does not depend only on the provision of such buffer container but that container is combined with a pressure sensor, which at a point downstream of the pressure generator detects the pressure in the feed line and delivers corresponding actual-value signals to a feedback loops which by a control of the pressure generator automatically controls that pressure at a predetermined setpoint. In apparatus of the present kind such an automatic control, which directly determines the pressure in the substance to be metered rather than the force exerted by a piston-cylinder unit, is new, particularly an automatic control of the pressure in the substance at a location near the nozzle. If the pressure in the substance is automatically controlled near the nozzle, the length of the line from there to the nozzle mouth will not have an essential influence on the metering accuracy; the influence on the metering accuracy will be smaller the shorter is the length of the line from the location of the pressure sensor to the mouth of the nozzle is and the smaller the volume of the substance in said line is. In practice it may be assumed that when the path between the location of the automatic control and the nozzle mouth is so short the metering accuracy will be exactly as high as the accuracy of the automatic control of the pressure in the substance at the location of the automatic control. A further advantage resides in that the apparatus in accordance with the invention has a very fast response because the pressure generator, the pressure sensor and the nozzle mouth are close to each other; the metering rate can be changed within response times of an order of milliseconds without an occurrence of hunting and the controller can be operated with a correspondingly steep control characteristic.

For this reason it is possible in accordance with the invention to control the discharge rate only in dependence on pressure in that the flow areas of the nozzle and of the feed line are not changed and variable setpoints are selected in the controller for the pressure between the buffer container and the nozzle. As a result, the apparatus in accordance with the invention is particularly suitable for use in automatic production.

Best results will be produced with the apparatus in accordance with the invention if the following rules are complied with: the pressure sensor should be as close as possible to the mouth of the nozzle; the line leading from the buffer container to the mouth of the nozzle should be as short as possible; at the same time, the buffer container should be as close as possible to the pressure sensor; the volumes in the buffer container and in the line from the buffer container to the mouth of the nozzle should be as small as possible.

How short the paths and how small the volumes that can be selected will depend on the technical boundary conditions which are determined by the specific application. For instance, the nozzle will generally be required to have a certain minimum length so that the nozzle can be held and guided and can optionally be rotatably mounted or can be introduced into a workpiece to a certain depth. The length of the line from the buffer container to the mouth of the nozzle which is permissible without an appreciable adverse effect on the metering accuracy will depend also on the viscosity of the substances to be processed. The higher the viscosity, the stronger will be the effect of the line: length on the metering accuracy. For a processing of the above-mentioned pasty sealants and adhesives of high viscosity, the line leading from the buffer container to the mouth of the nozzle should be shorter than 20 cm, preferably shorter than 15 cm.

The apparatus will be particularly compact so that the line lengths are short and the apparatus can well be manipulated by a robot if the nozzle and the buffer container are mounted on a common holder and the line from the buffer container to the nozzle extends in the holder and is as short as possible, and particularly if the buffer container is accommodated in the holder for the nozzle or in the nozzle itself or if the nozzle directly adjoins the buffer container so that a special line connecting them will not be required.

Because in accordance with the invention the pressure in the substance is automatically controlled near the nozzle, nozzles which can be closed by a valve can particularly also be used in the apparatus in accordance with the invention because in that case the substance will not dribble when the apparatus has just been shut down and there will be no excessive metering immediately after the apparatus has been turned on. Seat valves are particularly desirable, particularly needle valves which can assume only a closed position and an open position providing a constant flow area. The seat for the needle may be provided directly at the nozzle opening so that virtually no substance can dribble when the nozzle has just been closed. If the needle is used also to influence the flow rate of the substance through the nozzle, it will be preferable to provide for changing the stroke of the needle an adjusting member, particularly an adjustable stop. It has been explained hereinbefore that it is possible in such case in accordance with the invention to change the metering rate with a fast response by a change of the pressure in the buffer container in that the setpoint is correspondingly changed at the controller, preferably by numerical control. For this reason the apparatus in accordance with the invention is well suited for use in an automatic production line for the manufacture of automobiles.

It will also be possible, but less desirable, to use as a valve an adjustable valve, such as a rotary plug valve, a stem valve or a cone valve. Such adjusting valve will permit a variation of the metered rate in that the pressure detected by the pressure sensor is automatically controlled at a constant value and the metered rate is changed by a change of the flow area of the adjusting valve while the pressure is constant.

In the manufacture of automobile bodies it is not only required to apply sealants and adhesives at various rates to body parts or to inject them into body parts at various rates or to apply such substances in the form of beads or strips in various thicknesses, but in many cases it will be necessary to apply sealants and adhesives in strips which may not be straight but curved and particularly closed in a ring. If this is required for strips which are noncircular in cross-section (such as with box-section strips), it will be necessary that the nozzle can be rotated during its travel. On principle, the apparatus comprising the buffer container, the substance stored therein and the nozzle may be rotated as a whole. But because the buffer container communicates with its pressure generator and with a feed line for refilling it will be much more favorable to mount the nozzle and the buffer container on a common holder and to mount the nozzle for a rotation about its longitudinal axis relative to the buffer container. In that case the robot used to guide the nozzle may be connected directly to the nozzle or to a carrying member which is non-rotatably connected to the nozzle and the robot can then rotate the nozzle as may be required whereas that rotary movement need not be imparted to the holder on which the buffer container is mounted.

On principle, the line from the buffer container to the rotatable nozzle might consist of flexible tubing, which is connected by a rotary coupling either to the buffer container or to the nozzle or to both. But it will be better so to arrange the line that the line extends in the holder and to design the holder as a rotary coupling which surrounds the nozzle. In that case the line may be very short; this is important for the reduction of the invention to practice because relatively long connecting lines between the buffer container and the nozzle are not desired. On the other hand, the arrangement of the connecting line in the holder will open up the particularly desirable possibility that that line and also the nozzle can be heated in that the holder is heated. Such heating will be significant if the apparatus is used with hot-processable substances because the temperature thereof will influence the viscosity and, as a result, the metering accuracy, and can be stabilized by such heating. For this reason the apparatus in accordance with the invention preferably comprises one or more heating elements for heating the buffer container and/or the nozzle and at least one temperature sensor, which together with the heating elements is included in a feedback loop having a controller by which the temperature is stabilized at a setpoint which can be predetermined. The temperature sensor is suitably arranged in the holder at a location which is not far from the nozzle so that the sensor detects the temperature as close as possible to the nozzle; it is suitably also close to the pressure sensor. If the nozzle does not directly succeed the buffer container, a particularly constant temperature will be maintained if the holder and nozzle, on the one hand, and the buffer container, on the other hand, are automatically controlled by separate heating circuits, each of which comprises at least one heating element and one temperature sensor.

The use of a temperature sensor in the apparatus will be of advantage not only for hot-processable substances but also for cold-processable substances because they can be heated as they flow to the nozzle so that their viscosity will decrease and the metering accuracy can be influenced. This is desirably counteracted by a temperature sensor, which just as the pressure sensor is included in a feedback loop, the controller of which effects a secondary automatic control of the pressure in dependence of the measured temperature with use of stored empirical values.

If the line from the buffer container extends in the holder—as is preferred—it will be best to provide in the holder an annular passage which surrounds the nozzle or a shaft carrying the nozzle. The line coming from the buffer container should open in that annular passage and the annular passage should communicate with the mouth of the nozzle through a passage extending in the nozzle or in its shaft. Such annular passage will readily permit a rotation of the nozzle through 360° or more.

To special advantage, the pressure sensor is provided adjacent to the annular passage. The pressure sensor may so be arranged in the holder that the pressure sensor directly adjoins the annular passage and detects the pressure in the annular passage, i.e., at a location which is extremely close to the mouth. Whereas there is a pressure drop on the way to the annular passage, unforeseen pressure fluctuations need no longer be expected so that an automatically controlled, constant pressure in the annular passage will result in a correspondingly constant discharge of the substance from the nozzle mouth. For this reason the arrangement of the pressure sensor at the annular passage is highly advantageous. But the pressure sensor may alternatively be arranged in the buffer container if the path from the buffer container to the mouth of the nozzle is short.

For the purposes of the present invention the buffer container may consist of a container in which a piston is slidably guided, which is acted upon by the pressure generator. To permit a refilling of the buffer container, the feed line opens into the buffer container at a point in front of the piston in its foremost position. Besides, switching means are provided, which are responsive to forward and rear positions of the piston and which turn on the pump when they respond to the forward position of the piston and turn off the pump when they respond to the rear position of the piston. The force exerted by the pressure generator on the piston is so matched to the discharge pressure of the pump that the pressure in the feed line where it opens into the buffer container exceeds the pressure applied to the substance by the piston. A particularly suitable pressure generator consists of a fluid-operable piston-cylinder unit having a piston to which pressure fluid can be supplied at both ends. As the piston is pushed back during the refilling of the buffer container, friction losses will occur in the buffer container and in the pressure generator (piston-cylinder unit) acting thereon, particularly if the buffer container is also constituted by a piston-cylinder unit. If the pressure generator is constituted by a double-acting cylinder, the friction losses can be compensated if a predetermined pressure is permanently applied to the piston of the double-acting cylinder at the end which is remote from the piston which acts on the substance in the buffer container and a lower backpressure is applied to that piston at the opposite end during the operation of the pump. That backpressure is so selected that it just offsets the friction losses which occur during the refilling of the buffer container. The value of the backpressure may be determined as an imperical value and may then be used as a constant pressure. Besides, an unintended increase of the metering rate during the refilling operation will effectively be prevented in that the pressure is automatically controlled by means of the pressure sensor.

The pump which discharges the substance from the supply container (barrel) into the buffer container exhibits a slow response. For this reason the pressure in the buffer container may drop for a short time as the pump is turned on until the pump has reached its full discharge rate, provided that the backpressure is built up in the double-acting cylinder when the pump is turned on. In that case the turning off of the pump may result in a rise of the pressure in the buffer container until the discharge pressure of the pump has decreased, provided that the back-pressure in the double-acting cylinder is decreased when the pump is turned off. For this reason a time delay element is preferably provided, which slightly delays the build-up of the back-pressure relative to the turning on of the pump and also slightly delays the decrease of the back-pressure relative to the turning off of the pump. The described compensation of the friction loss will facilitate the automatic control of the pressure in the substance by means of the pressure sensor.

The buffer container may be constituted by a cylinder in which a displacer piston is slidably mounted or it may consist of a container into which a plunger extends. The friction losses which will then be due to the piston movement can desirably be avoided by a buffer container, which consists of an extensible section of the feed line and which is subjected to pressure from the pressure generator from the outside. Such buffer container can be provided in the simplest manner in that two tubing sections or two short pipes which are constituent parts of the feed line are interconnected by an extensible hose and that assembly is accommodated in a pressure chamber, to which a preselectable pressure can be applied by a final control valve. The pressure chamber may consist, e.g., by a cuff, which surrounds the feed line in that section.

Another desirable variant is a buffer container which contains at least one bellows, the interior of which communicates with a controllable source of fluid pressure. In both cases the capacity of the buffer container can be changed virtually without friction. Alternatively, said two variants may be combined in such a manner that one or more bellows are contained in a chamber or in a cage and act on an extensible section of the feed line, which extends through the cage or chamber. Owing to the interaction between the individual or more bellows and the extensible section of the feed line that section may be more or less constricted or expanded.

The apparatus in accordance with the invention has the following advantages:
—light-weight structure;
—small overall size;
—use of a buffer containers having a very small capacity so that metering errors which are due to the compressibility are minimized;
—continuous, uninterrupted application of the substances because the buffer container can be refilled during the merging operation without an adverse effect on the metering accuracy;
—automatic control of the pressure at a location which is close to the mouth of the nozzle;
—simple and particularly pressure-dependent, undelayed control of the metering rate;
—ease of manipulation by a robot and complies with all requirements arising in an automatic production in the automobile industry. The invention may successfully be applied also in other technical fields in which a metering of adhesives and sealants with high accuracy or buffer container, the nozzle and the pressure sensor. Whereas the problems involved in the connection is required, e.g., in the sealing of insulating glass panes, particularly for windows in automobiles, which windows owing to their uniformly curved edge involve special requirements regarding the metering accuracy and a quick change of the metering rate.

The invention may be used in an apparatus for metering pasty, compressible substances, which apparatus is not continuously refillable but operates intermittently and comprises a small supply container, which serves to receive the substance and is refilled or replaced in non-metering intervals. In such apparatus the nozzle is mounted directly on the supply container or is connected thereto, at most, by as for feed line, and together with the supply container constitutes a unit of construction in which the supply container and the nozzle are optionally rotatable relative to each other but are rigidly or stiffly connected to each other. In such apparatus it is also contemplated in accordance with the invention to change the capacity of the supply container by a pressure container, which is directly mounted on or in the supply container, and a pressure sensor is provided, which detects the pressure at a location which is downstream of the pressure generator and which together with the pressure generator is included in a feedback loop, which automatically controls that pressure at a predetermined setpoint. Those further features of the invention which have been described for the uninterruptedly operable apparatus can also be applied to the apparatus-which can be only intermittently operated, particularly as regards the design and arrangement of the of a relatively long feed line will not arise in such case, an automatic control of the pressure of the substance close to the nozzle mouth will also be advantageous for a high metering accuracy in the application to an apparatus for intermittent operation.

BRIEF DESCRIPTION OF THE DRAWINGS

Illustrative embodiments of the invention are diagrammatically shown in the accompanying drawings.

Figure 1:
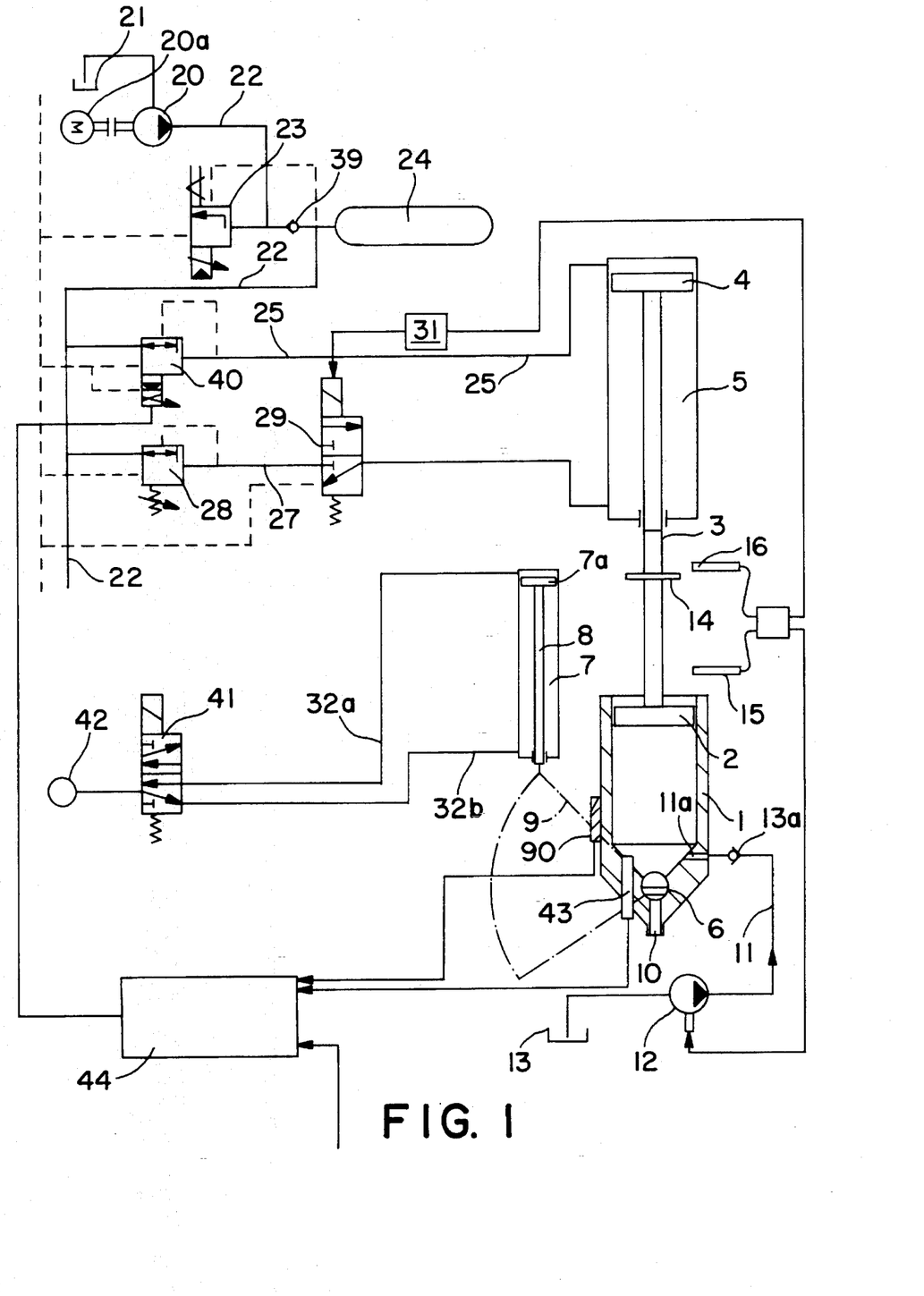
FIG. 1 shows a first apparatus comprising a buffer container shown in section and includes a circuit diagram for the associated pressure fluid system and the control means.
Figure 2:
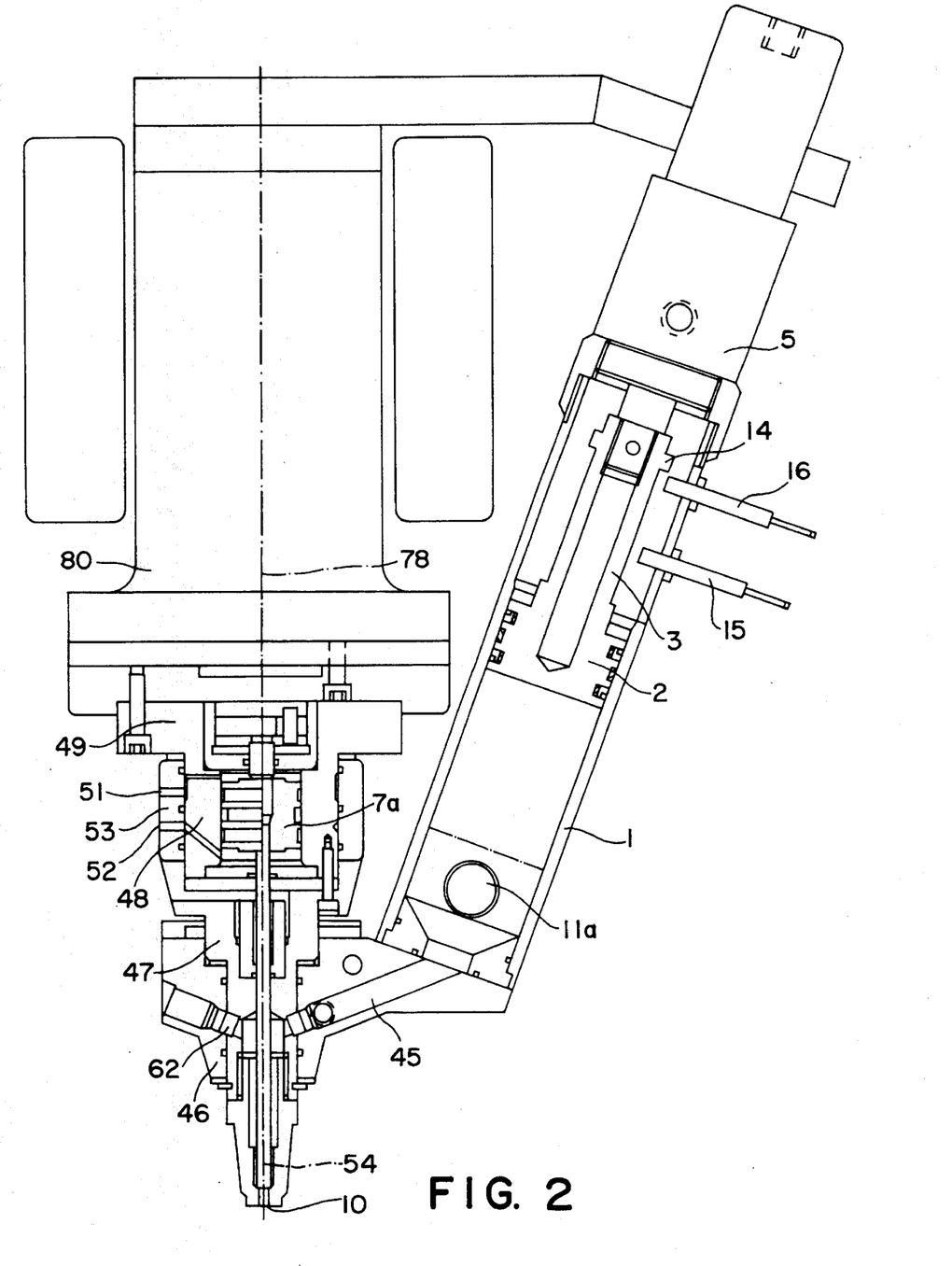
FIG. 2 shows as a detail the buffer container of FIG. 1 with another nozzle, which can be closed.

The apparatus shown in FIG. 1 contains a buffer container 1 in the form of a cylinder for holding a pasty compressible substance of high viscosity. A piston 2 is slidably mounted in the buffer container 1 and is connected by a piston rod 3 to the piston 4 of a double-acting fluid-operable cylinder 5, which serves as a pressure generator for the buffer container 1. The fluid-operable cylinder may be hydraulically or pneumatically operated. In the present case a hydraulic operation is assumed.

A final control valve 6 consisting of a rotary plug valve is provided in the apex portion of the buffer container 1 and can be operated by a hydraulically or pneumatically operable actuating cylinder 7, which has a piston rod 8 that is pivoted to a lever 9, which is connected to the rotatable valve plug and is only symbolically indicated in the drawing. A nozzle 10 is formed immediately in front of the rotary plug valve 6.

DETAILED DESCRIPTION OF THE INVENTION

A feed line 11 opens into the buffer container 1 close to the rotary plug valve 6 and comes from a pump 12, which pumps the highly viscous substance out of a supply container 13, which usually consists of a barrel, and into the buffer container 1. A non-return valve 13a in the feed line 11 prevents a forcing of the substance back into the feed line 11 by the piston 2.

A projection 14 is provided on the piston rod 3 and in the illustrative embodiment consists of a ring. Switching means for controlling the piston movement consist of two sensors 15 and 16, which are arranged beside the piston rod 3 one behind the other in the longitudinal direction of the piston rod and are responsive to the position of the projection 14.

The fluid system for actuating the fluid-operable cylinder 5 and the actuating cylinder comprises a fluid pump 20, which is operated by a motor 20a and pumps the fluid consisting of a hydraulic liquid from a supply container 21 into a main fluid line 22, which is protected by a relief valve 23 and is connected by a non-return valve 39 to a pressure accumulator 24. For applying pressure to the rear end of the piston 4, a branch line 25, which incorporates a proportionally controllable pressure-reducing valve 40, leads from the main fluid line 22 to the rear end of the cylinder. Pressure can be applied to the forward end of the piston 4 via a further branch line 27, which incorporates a pressure-reducing valve 28 and leads from the main fluid line 22 to the forward end of the cylinder 5.

In that example the actuating cylinder 7 is pneumatically actuated. To that end, a four/two-way valve 41 is provided with two vents and is connected at one end to a compressed air source 42 and at the other end to the two ends of the double-acting cylinder 7.

When the valve 41 is in its illustrated position compressed air is supplied to the forward end of the piston 7a so that the valve 6 in the buffer container i is fully opened. When the valve 41 is in its second position, pressure is applied to the rear end of the piston 7a so that the valve 6 is entirely closed.

A pressure sensor 43 is provided in the apex portion of the buffer container i and preferably comprises a strain gage. The pressure sensor 43 and the proportional pressure-reducing valve 40 are connected to a controller 44 to provide a feedback loop for controlling the pressure in the substance.

The apparatus operates as follows:

A predetermined pressure is applied to the rear end of the piston 4 through the branch line 25. When the valve 6 having an invariable flow area is open, the predetermined pressure which is applied to the piston 4 and which can be varied in a controlled manner will determine the rate at which the substance is extruded from the metering cylinder 1. That rate is determined in that a setpoint is selected for the controller 44. That setpoint may be provided by a numerical control system. In that case the controller 44 will effect a quick and exact automatic control of the desired metering rate.

Alternatively, the pressure in the substance can automatically be controlled at a constant value and the rate of discharge from the nozzle 10 may be changed in that the flow area of the valve 6 is changed by means of the actuating cylinder 7. During a standstill of the pump 12 the piston 2 is advanced until the projection 14 on the piston rod 3 registers with the forward sensor 15 so that the latter responds by delivering a signal which turns on the pump 12 and which shifts the solenoid valve 29 with a time delay to its second position, in which the branch line 27 is not interrupted so that a backpressure is applied to the front end of the piston 4. A realistic magnitude of that backpressure is 10 bars. By that backpressure, the friction losses occurring as the piston 4 and the piston 2 are pushed back will be compensated so that the substance which is fed by the pump to the buffer container 1 will not increase the pressure in that container. Because a certain time will elapse after the turning on of the pump 12 until the discharge pressure of the pump 12 has been transmitted as far as to the mouth 11a of the feed line 11 at the buffer container 1, the pressure in the buffer container 1 would drop for a corresponding time if the solenoid valve 29 were shifted to effect a partial pressure relief of the piston 2 as the pump 12 is turned on. That effect is prevented by the time-delay element which delays the actuation of the solenoid valve 29 by a certain interval of time, which can be determined empirically and is of an order from 0.1 to 0.5 second.

Under a pressure which exceeds the pressure applied by the piston 2 the pump 12 reeds the substance from the supply container 15 into the buffer container 1 so that the piston 2 is pushed back. During that refilling operation the substance can still be extruded from the nozzle 10 at a corseant metering rate. The refilling operation will be terminated when the projection 14 registers with the second, rear sensor 16 so that the latter responds and acts on the pump 12 and, with a time delay, shirts the solenoid valve 29 to its position shown on the drawing and the forward end face of the piston 4 is thus relieved from pressure. At that time the time delay serves to maintain the backpressure in the cylinder until the pressure in the feed line 11 has been equalized after the pump has been turned off. The magnitude of the time delay is or the same order as after the turning of the pump 12.

The two sensors 15 and 16 are so arranged that the two pistons 2 and 4 will always be in a floating position.

By means of the illustrated apparatus, a pasty substance of high viscosity can uninterruptedly be applied with a constant metering accuracy as long as the pump 12 is operated to deliver additional substance continuously or intermittently at a sufficient rate from a barrel, which may stand aside. If two barrels are provided, from which the substance can be pumped in alternation, even a change of the barrel will not result in an interruption of the metering operation.

FIGS. 2 to 5 show a practical example of the buffer container 1 with an attached nozzle 10. A holder 46 is provided, in which a shaft 47 having a longitudinal through bore is rotatably mounted. Because the nozzle 10 is screwed into the forward end of the shaft 47, the shaft 47 may be described as a nozzle shaft. A cylinder 48 is screwed to the rear end of the nozzle shaft 47 and is provided at its rear end with a flange 49, by which the cylinder 48 can be attached to a robot 80. A piston 50 is contained in the cylinder 48 and through two lateral ports 51 and 52 in a ring 53 which surrounds the cylinder 48 it is possible to supply a fluid to both ends of the piston. A needle 54, which is coaxial to the nozzle, is secured in the piston 50 and serves to close the nozzle 10. The needle 54 is guided in the nozzle shaft 47 by a bushing 55, which has been screwed into the nozzle shaft from its rear end.

The cylinder 48 is closed at its rear end by a closure member 58, through which a bolt 59 extends, which is sealed by means of an O-ring 57 and serves as a stop for the piston 50. The bolt 59 terminates in a disk 60, which is provided with external screw threads and has been screwed into a corresponding tapped bore of the closure member 58. The stroke of the needle 54 can be adjusted by a turning of the disk 60. A threaded bolt 61 has been screwed into the disk 60 in order to lock it in position.

Figure 3:
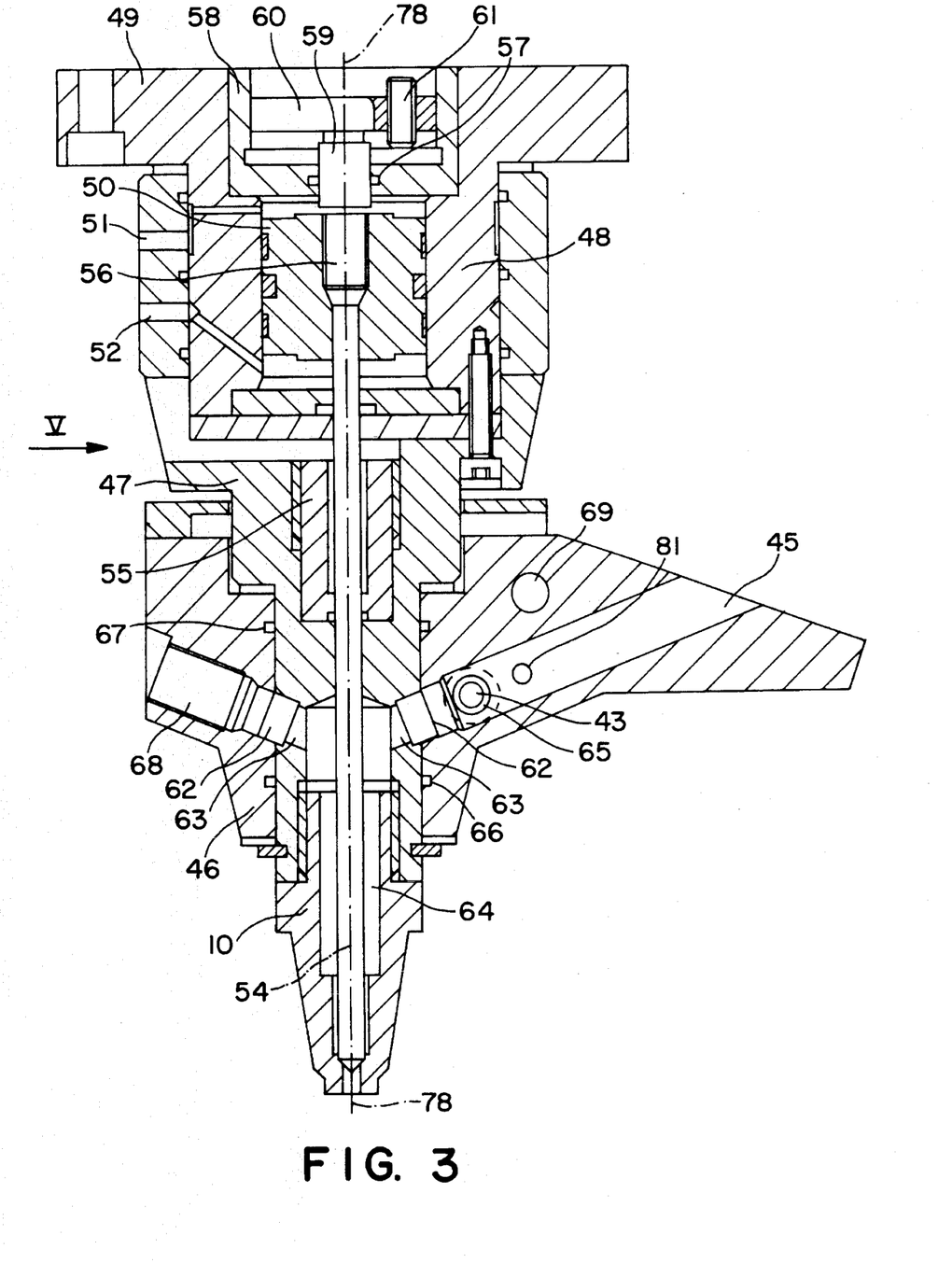
FIG. 3 shows as a detail of FIG. 1 in a longitudinal sectional view the holder for the buffer container and the nozzle which is rotatably mounted in said holder, but does not show the buffer container.
Figure 4:
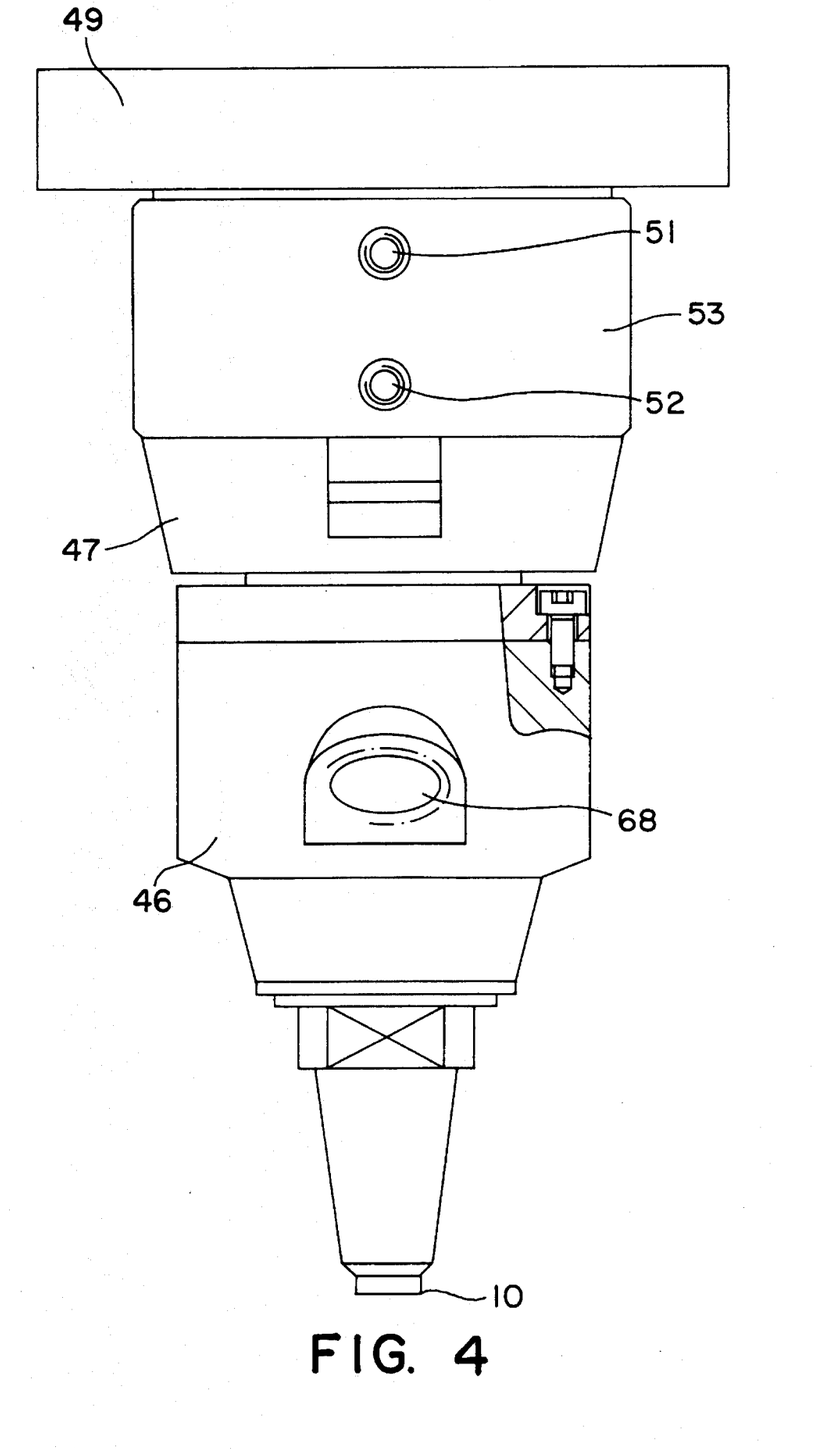
FIG. 4 is an elevation showing the holder and the rotatable nozzle, viewed in the direction of the arrow V in FIG. 3.

A line 45 consisting of a bore extends obliquely into the holder 46 and opens into an annular passage 62, which surrounds the nozzle shaft 47. At that location the nozzle shaft has two correspondingly inclined, short bores 63, which connect the annular passage 62 to the axial passage 64 of the nozzle shaft.

A bore 65 extends in the holder transversely to the line 45 and opens into the line 45 close to the annular passage 63. That bore 65 serves to receive a pressure sensor 43.

The nozzle shaft 47 is sealed relative to the holder 46 by means of two O-rings 66 and 67, which are disposed on opposite sides of the annular passage 62.

Figure 5:
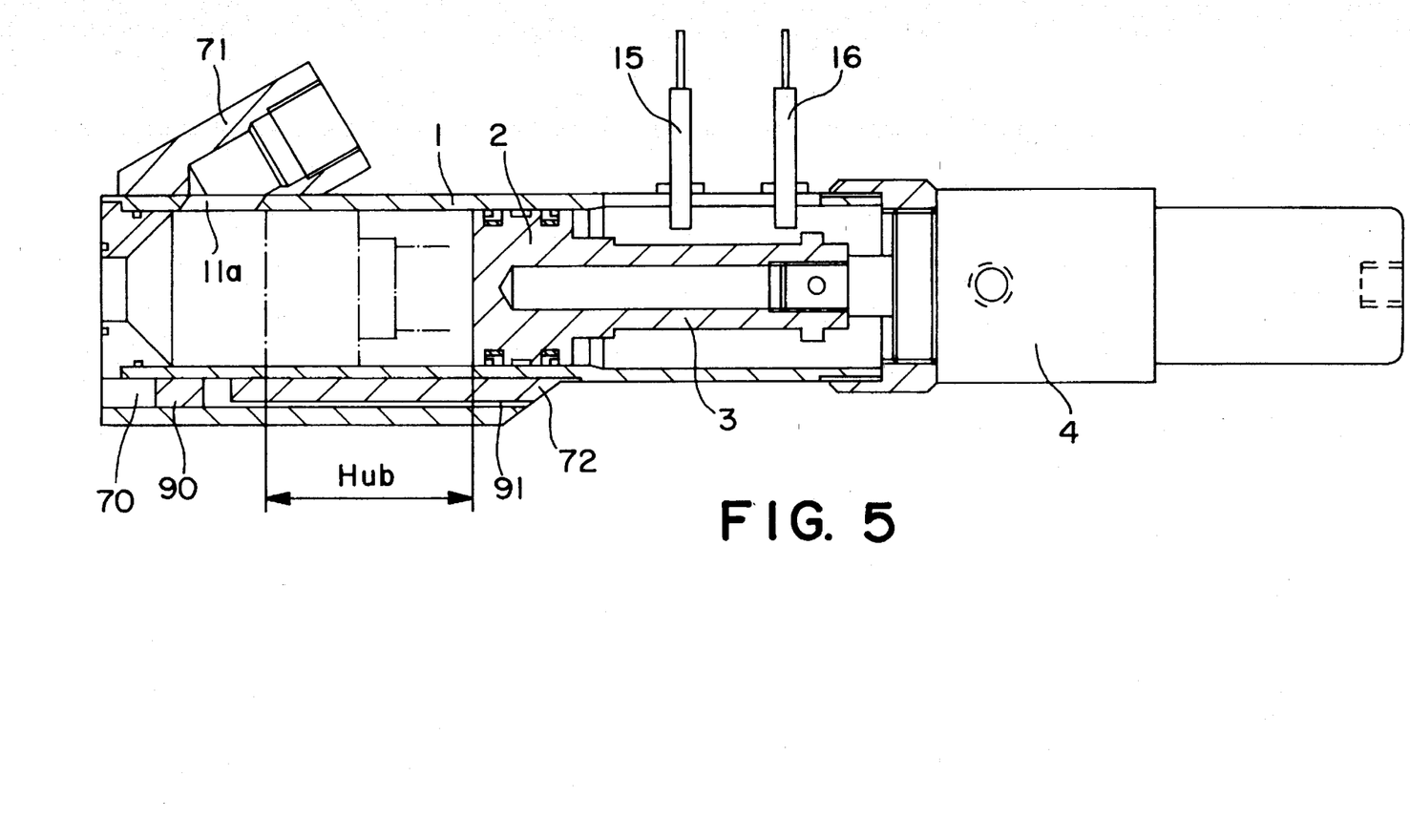
FIG. 5 is a detail showing in a longitudinal sectional view the buffer container which is to be secured to the holder of FIG. 3 and the cylinder for actuating the piston of said buffer container, which cylinder is mounted on said buffer container but is not shown in section.

A cylindrical buffer container 1 is attached at the location at which the line 45 leaves the holder 46 and in such a manner that the forward end of the container 1 is aligned with the inlet opening of the line 45. The buffer container is provided with longitudinal bores 72 which have at the forward end of the container a tapped portion 70 by which that container can be screwed to the holder 46. An inclined tubular port 71 is laterally attached to the buffer container 1 at its forward end and a pressure hose can be secured to that port and may be use to refill the buffer container 1 with the substance which is to be extruded. The piston 2 is displaceably disposed in the buffer container 1 and is provided with a piston rod 3, which has a projection 14 that consists of an annular collier, the position of which is detected by the two sensors 15 and 16, which determine the end positions of the piston 2. The forward end position of the piston 2 is indicated by a broken line.

The piston rod 3 extends into the fluid-operable cylinder 4, which actuates the piston 2.

The buffer container 1 is provided in its wall with at least two longitudinally extending bores 72 for receiving at least one electric heating element 91 and a temperature sensor 90. The heating element serves to heat the buffer container 1 and the substance contained therein. The nozzle 10 can also be heated by a heating of the holder 46 which surrounds the nozzle. To that end the holder 46 has further bores 68, one of which is shown. Said bores serve to receive electric heating elements. Alternatively, one of said bores may receive the pressure sensor 43. Bores which are not required will be closed by end plugs. A transverse bore 69 which extends in the holder 46 beside the line 45, or a bore 81 which opens into the line 45 and when not used is closed by an end plug, serves to receive a temperature sensor. The temperature sensor may consist of an electric resistance thermometer. The temperature sensors and the electric heating elements may be connected in a feedback loop to maintain adjacent to the nozzle a temperature which is as uniform as possible. It is desirable to provide separate temperature-controlling feedback loops for the holder 46 and the buffer container 1 and the feedback loop for the holder 46 suitably consists of a PID control loop. For the buffer container 1 a simple two-position controller will be sufficient. The temperature is preferably so adjusted that the temperature in the buffer container is only slightly below the temperature in the holder 46.

The bore 81 is particularly suitable for receiving a temperature sensor for compensating in the processing of cold substances the influence of an undesired temperature rise by a temperature dependent secondary automatic control of the pressure.

Figure 6:
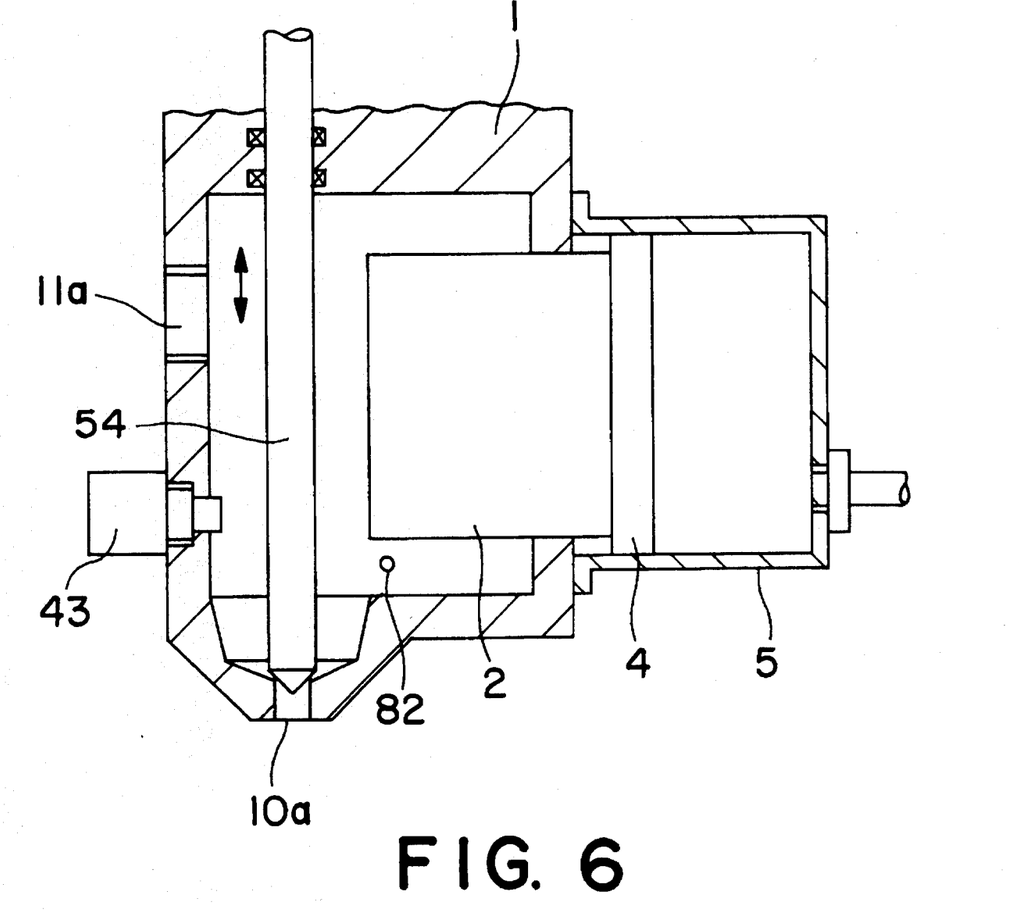
FIG. 6 is a longitudinal sectional view showing a different compact unit consisting of a nozzle, buffer container and pressure generator.
Figure 7:
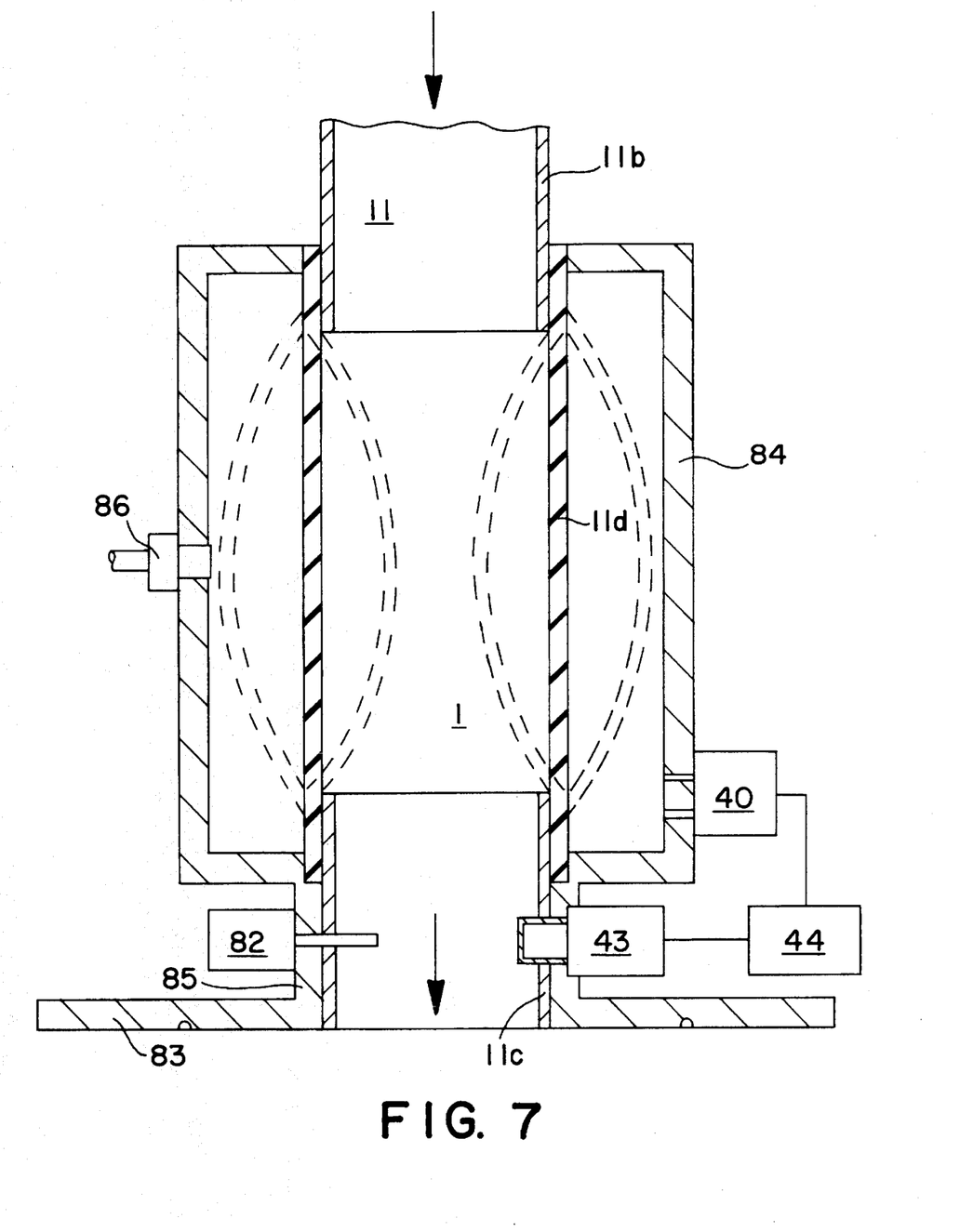
FIG. 7 is a longitudinal sectional view showing an extensible buffer container and a pressure generator surrounding said container.
Figure 8:
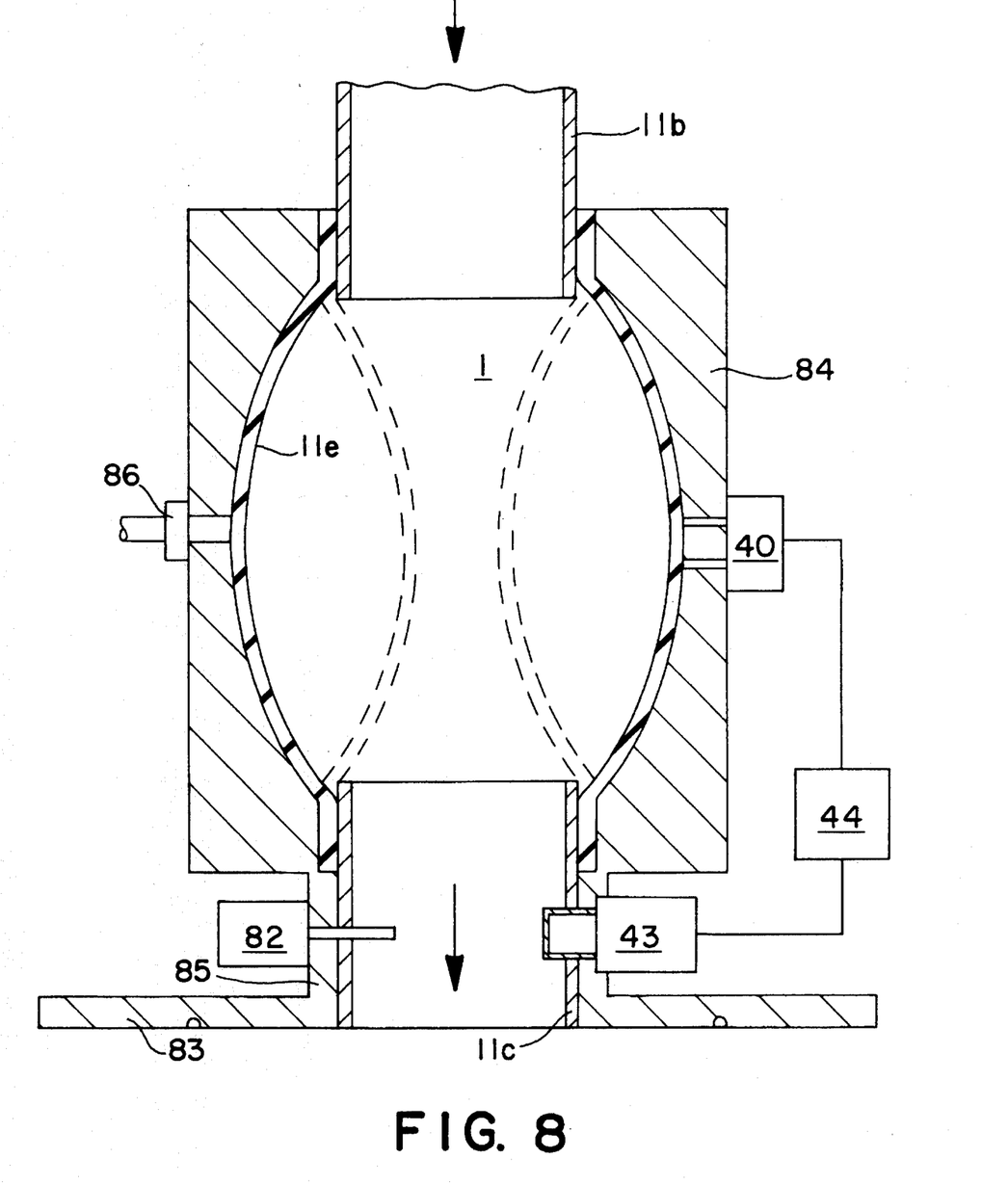
FIG. 8 shows as a detail in a view like that of FIG. 7 a buffer container having a capacity which can be varied by a bellows.

For the sake of simplicity, parts which are functionally equivalent to parts of preceding illustrative embodiments will be designated with the same reference characters in the illustrative embodiments shown in FIGS. 6, 7, and 8.

FIG. 6 shows a particularly compact subassembly, in which the buffer volume is accommodated in the nozzle body so that the nozzle body constitutes also the buffer container 1, which is provided on its underside with a nozzle mouth 10a, which can be closed by means of a valve needle 54, which extends transversely to the buffer container 1. A fluid-operable cylinder 5 is flanged to the buffer container 1 at one end thereof and contains a slidably guided piston 4, which is continued by a thick plunger 2, which protrudes into the buffer container 1 and in dependence on its position more or less restricts the capacity of the buffer container 1. A pressure sensor is provided in the wall of the buffer container 1 opposite to the plunger 2 and a temperature sensor 82 is fitted in a further bore in the wall of the buffer container close to the nozzle mouth 10a. In that case the pressure of the substance can automatically be controlled close to the mouth 10a of the nozzle.

The wall of the buffer container 1 is also provided with an opening 11a for connecting a feed line for the substance.

FIG. 7 shows a particularly elegant illustrative embodiment of a unit that consists of a buffer container and a pressure generator. Two tubing sections 11b and 11c of the feed line 11 are pressure-tightly interconnected by an extensible flexible tube 11d, which is pressure-tightly surrounded by a chamber 84, to which a fluid can be fed from the outside through a final control valve 40. The chamber 84 is provided at one end with an extension 85, which constitutes a tubular port, which surrounds the tubing section 11c and terminates in a flange 83, which serves For the fixation to a holder, e.g., to the holder 46 shown in FIG. 2, rather than the buffer container 1 provided there. Alternatively, a nozzle might directly be secured to the flange 83.

Two bores are provided in the tubular port 85 and lead into the interior of the tubing section 11c. A pressure sensor 43 is fitted in one bore and a temperature sensor 82 is fitted in the bore, which is prierably opposite to the former. It has merely diagrammatically been indicated that the pressure sensor 43 together with the final control valve 40 and a controller 44 are included in a pressure-controlling feedback loop. The temperature sensor 82 may also be included in a feedback loop.

The flexible tube 11d is cylindrical in an unpressurized state. When substance is fed by a pump in the direction indicated by an arrow, the flexible tube 11d will be able to expand when less substance or no substance is flowing out of the nozzle. When the feed pump is turned off or when it is feeding less substance than is discharged by the nozzle, the flexible tube 11d will be contracted. In booth cases the final control valve 40 will so be controlled by the controller 44 that the pressure that is required an exact metering will be obtained in the tubing section 11c, in which the pressure sensor 43 is provided.

A sensor 86 for the control of the feed pump is suitably provided in a bore of the chamber 84 and is responsive to the position of the flexible tube 11d.

The illustrative embodiment shown in FIG. 8 is very similar to that shown in FIG. 7 so that reference may be made to the description of FIG. 7. A difference from FIG. 7 resides in that the two tubing sections 11b and 11c in FIG. 8 are not connected to each other by a cylindrical flexible tube but by a barrel-like bellows 11e. When that bellows 11e is in that position which is shown by solid lines and in which the buffer container has its maximum capacity, the bellows 11e will snugly contact a correspondingly barrel-like inside surface of the chamber 84. In dependence on the pressure applied through the final control valve 40, the bellows 11e can disengage the surface of the chamber 84 and can constrict the flow area of the buffer container.

I claim:

1. An apparatus for delivering a pasty compressible substance of high viscosity, particularly for applying sealants and adhesives to automobile body parts in the manufacture of automobile bodies, the apparatus comprising:

a supply container (13) for holding the substance, a nozzle (10) having a mouth for discharging the substance, a feed line (11, 45) leading from the supply container (13) to the nozzle a pump (12) for feeding the substance into the feed line (11, 45), a holder for holding the nozzle, a buffer container (1) disposed on the holder (46) close to the mouth of the nozzle (10) in fluid flow connection to the feedline, and having a variable volume, a pressure generator (2 to 5), which is disposed directly on or in the buffer container (1) and is provided in addition to the pump (12), said pressure generator acting upon the buffer container to vary the volume thereof, a flow path (45, 64, 10) between the pressure generator (2 to 5) and the nozzle mouth forming part of the feed line, and a pressure sensor (43) which detects the pressure in the flow path (45, 64, 10) at a location which is downstream of the pressure generator (2 to 5), both the pressure sensor and the pressure generator forming part of a control loop (43, 44, 40, 25, 2 to 5) for automatically controlling pressure in the flow path at a predetermined setpoint.

2. An apparatus for delivering a pasty compressible substance of high viscosity, particularly for applying sealants and adhesives to automobile body parts in the manufacture of automobile bodies the apparatus comprising:

a supply container for holding the substance, a nozzle having a mouth for discharging the substance, a feed line leading from the supply container to the nozzle, a pump for feeding the substance into the feed line, a holder for holding the nozzle, a buffer container is disposed in the nozzle a pressure generator which is disposed directly on or in the buffer container and is provided in addition to the pump, said pressure generator acting upon the buffer container to vary the volume thereof, a flow path between the pressure generator and the nozzle mouth forming part of the feed line, and a pressure sensor which detects the pressure in the flow path at a location which is downstream of the pressure generator, both the pressure sensor and the pressure generator forming part of a control loop for automatically controlling pressure in the flow path at a predetermined setpoint.

3. An apparatus according to claim 1, characterized in that the pressure sensor (43) is disposed between the buffer container (1) and the mouth of the nozzle (10).

4. An apparatus according to claim 1, characterized in that the nozzle (10) adjoins the buffer container (1).

5. An apparatus according to claim 1, characterized in that a valve (6, 54) for closing the nozzle (10) is provided in the nozzle (10).

6. An apparatus according to claim 5, characterized in that the valve (6) is a control valve.

7. An apparatus according to claim 1, characterized in that the nozzle (10) is rotatably mounted on a holder (46) for rotation relative to the buffer container (1) about an axis (78) which extends through the mouth of the nozzle (10), the buffer container (1) being rigidly connected to the holder (46).

8. An apparatus according to claim 1, characterized in that the pressure generator (2 to 5) comprises a piston (2) which is slidably guided in the buffer container (1), that the feed line (11) runs into the buffer container (1) at a location in front of the piston (2) in its foremost position, that switching means (15, 16) are provided, which are responsive to the piston in forward and rear positions thereof and respond to the forward position of the piston (2) by turning on the pump (12) and respond to the rear position of the piston (2) by turning off the pump (12), and the force exerted by the pressure generator (3 to 5) on the piston (2) is so matched to the discharge pressure of the pump (12) that the pressure in the feed line where it runs (11a) into the buffer container (1) exceeds the pressure which is exerted by the piston (2) on the substance.

9. An apparatus according to claim 8, characterized in that said pressure generator comprises a fluid-operable piston-cylinder unit and a piston (4) adapted to be supplied with fluid at both its ends and supplied with a fluid under constant pressure at that end which faces away from said piston (2) acting on the substance and at its other end is supplied during the operation of said pump (12) with a fluid which is under preselected, substantially constant backpressure that is lower than said constant pressure.

10. An apparatus according to claim 1, characterized in that the holder (46) contains an annular passage (62) which surrounds the nozzle (10), or a shaft (47) which carries the nozzle (10), said annular passage is open to the nozzle (10) or to its shaft (47), the flow path (45) coming from the buffer container (1) opening into said annular passage and said annular passage communicating with the mouth of the nozzle (10) through an axial passage (64) that extends in the nozzle (10) or its shaft (47).

11. An apparatus according to claim 1, characterized in that the buffer container (1) is an extensible section (lid) of the feed line and is subjected on an outside area to pressure applied by the pressure generator (40, 84).

12. An apparatus according to claim 1, characterized in that the buffer container (1) is a section of the feed line and contains at least one bellows (11e) dividing the buffer container (1) into spaces internal and external of said bellows, a source of fluid (40) being provided which communicates with said external space if the flow path traverses said internal space or which communicates with said internal space if the flow path traverses the external space.

13. An apparatus according to claim 1, characterized in that one or more heating elements for heating the buffer container (1) and/or the nozzle (10) are provided for a hot processing of substance and a temperature sensor is provided, besides or in the flow path at a location upstream of the pressure generator and which serves to control the heating elements and which together with the heating elements is included in a feedback loop.

14. An apparatus according to claim 1, characterized in that the control loop comprising said pressure sensor performs a primary control of the pressure in said flow path and a temperature sensor is arranged beside or in the flow path at a location downstream of the pressure generator and that for a cold processing of the substance the temperature sensor (69) and the pressure generator (2 to 5) are included in a feedback loop including a controller (44) for a secondary control of the pressure in said flow path in dependence on the measured temperature in accordance with stored empirical values.

15. An apparatus according to claim 1, in which said flow area and a change of the rate of discharge of the substance while a flow area of the flow path (45, 64, 10) remains constant between the buffer container (1) and the mouth of the nozzle (10) can be effected in that the pressure in said flow path is adjusted to a desired value by the adjustment of a variable setpoint at a controller which is included in said control loop (44).

16. An apparatus according to claim 1, characterized in that the pressure sensor (43) is disposed adjacent to the mouth of the nozzle (10) under the technical boundary conditions existing in the specific application.

17. An apparatus for metering pasty compressible substances of high viscosity, particularly for applying sealants and adhesives to automobile body parts in the manufacture of automobile body parts, the apparatus comprising:

a supply container (1) which serves to hold the substance and has a variable volume to be occupied by said substance, a pressure generator acting upon or in the supply container and thereby varying the volume thereof, a nozzle (10) which serves to discharge the substance and is coupled to the supply container (1) and which together with the supply container (1) constitutes a unit which is rigid or stiff, except for the nozzle which optionally may be rotatably mounted at the supply container (1), and a pressure sensor (43) which detects the pressure existing at a location downstream of the pressure generator (2 to 5), which pressure sensor (43) and the pressure generator (2 to 5) are included in a feedback loop (43, 44, 40, 25, 2 to 5) for automatically controlling pressure at a predetermined value during the metering action.

* * * * *